United States Patent Office 3,040,837
Patented June 26, 1962

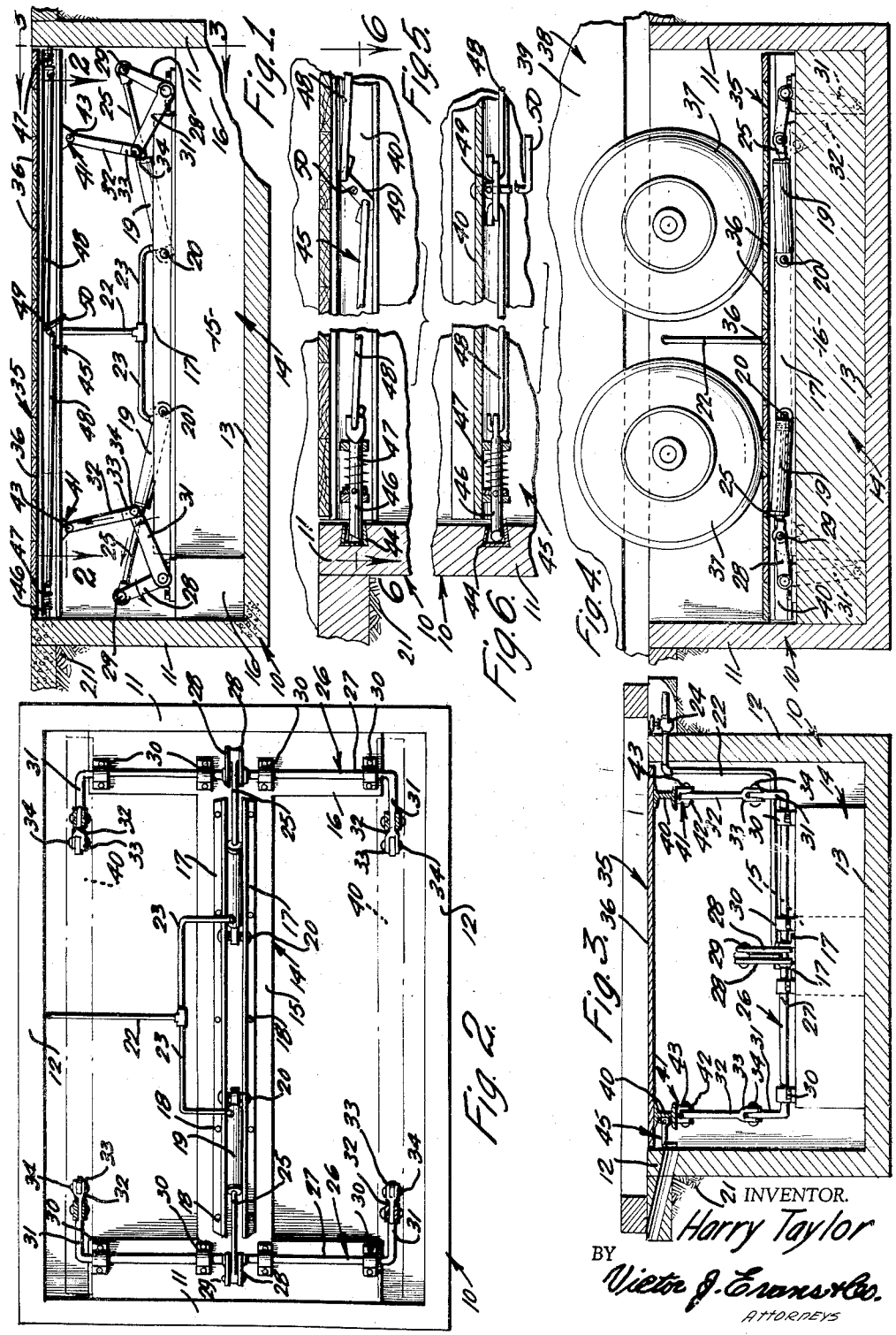

3,040,837
TRAILER PIT HOIST
Harry Taylor, Tremonton, Utah
Filed July 19, 1960, Ser. No. 43,855
4 Claims. (Cl. 187—8.5)

This invention relates to a trailer or mobile home, and more particularly to an accessory for use with a trailer when the trailer is parked or stationary.

The object of the invention is to provide a pit hoist which is adapted to engage the wheels of the trailer when the trailer is parked wherein the wheels of the trailer can be permitted to be lowered down into the pit as desired so as to provide a means whereby the body of the trailer can rest on a base or on the ground so as to help keep cold or adverse weather conditions away from the interior of the trailer, and wherein the present invention will also help keep water lines on the trailer from freezing.

Another object of the invention is to provide a trailer pit hoist which is adapted to be used for eliminating corner jacks, and wherein the trailer can rest down on a base so that it will automatically level the trailer and wherein underneath drafts will be eliminated, and wherein the trailer body will be lower to the ground so that there will be no steps to climb and also the present invention will help take weight off the tires and springs of the trailer.

A further object of the invention is to provide a trailer pit hoist which helps protect the tires from adverse weather conditions, and wherein the present invention will insure that the trailer will be safer in wind storms, the present invention including a vertically movable platform which can be quickly and conveniently raised or lowered as desired, and wherein the present invention also provides a means whereby the trailer park operator can insure that the trailer cannot surreptitiously be moved from the trailer park as for example by a person who is attempting to leave without paying rent.

A further object of the invention is to provide a trailer pit hoist which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a vertical sectional view taken through the trailer pit hoist of the present invention, and showing the platform and associated parts in raised position.

FIGURE 2 is a sectional view taken on the line 2—2 of FIGURE 1.

FIGURE 3 is a sectional view taken on the line 3—3 of FIGURE 1.

FIGURE 4 is a view similar to FIGURE 1, but showing the parts in lowered position and showing the wheels of the trailer in engagement with the platform and with the platform in the retracted or lowered position down in the pit.

FIGURE 5 is a fragmentary sectional view illustrating the locking mechanism by helping to maintain the platform in raised position.

FIGURE 6 is a sectional view taken on the line 6—6 of FIGURE 5.

Referring in detail to the drawings, the numeral 10 indicates a pit which may be adapted to be fabricated of a suitable material such as concrete, and the pit 10 is adapted to be arranged in a suitable opening in the ground such as the ground 21, FIGURE 1. As shown in the drawings the pit 10 includes spaced parallel vertically disposed end walls 11, as well as spaced parallel vertically disposed side walls 12 and a horizontally disposed bottom wall 13.

Arranged in the lower portion of the pit 10 is a base which is indicated generally by the numeral 14, and the base 14 includes a main straight portion 15 as well as transversely disposed end portions 16, FIGURE 2.

There is further provided a pair of horizontally disposed spaced parallel angle irons 17 which are adapted to be secured to the portion 15 of the base 14 in any suitable manner, as for example by means of securing elements 18. The numeral 19 designates each of a pair of cylinders, and these cylinders 19 may be hydraulically actuated, and the inner ends of the cylinders 19 are pivotally fastened to the angle irons 17 as for example by means of pivot pins 20. The numerals 22 and 23 indicate conduits or lines which are adapted to be used for conveying hydraulic fluid under pressure to and from a suitable source of supply, and a control valve 24 may be provided for controlling the flow of hydraulic fluid through these conduits. Piston rods 25 are connected to the cylinder 19, and the outer ends of the piston rods 25 are pivotally connected to pairs of lugs 28 through the medium of a pivot pin 29. The lugs 28 are secured as by welding to a shaft portion 27 of a crank 26, and the shaft portion 27 is rotatably supported by means of bearings 30 which are suitably affixed to the end portions 16 of the base 14. The crank 26 also includes right angularly arranged or transversely disposed fingers 31 on the ends thereof, as for example as shown in FIGURE 3, and the numeral 32 indicates links which have bifurcated end portions 33 that are pivotally connected to the ends of the fingers 31 as for example by means of pivot pins 34.

As shown in the drawings, there is further provided a vertically adjustable or movable platform 35 which is mounted for movement as for example from the raised position shown in FIGURE 1 to the lowered position shown in FIGURE 4 so that the platform 35 is capable of being retracted or moved downwardly into the interior of the pit 10. The platform 35 may consist of a plurality of separate planks or boards 36 which may be suitably secured together in any suitable manner, and as shown in FIGURE 4 the platform 35 is adapted to be engaged by the wheels such as the wheels 37 of the trailer 38, and the trailer 38 is of conventional construction and may include a main body portion 39 which can be used in the usual manner as a mobile home or the like. While only one of the trailer pit hoists of the present invention has been shown, it is to be understood that the number can be varied as desired so that for example for each set of whels of the trailer, a suitable trailer pit hoist can be provided whereby all of the wheels can be selectively lowered as for example as shown in FIGURE 4 when the trailer is parked in a trailer park or the like.

Arranged immediately below the platform 35 and secured thereto in any suitable manner is a pair of horizontally disposed vertically movable spaced parallel I-beams 40, and brackets 41 are secured beneath the beams 40 in any suitable manner, and the brackets 41 each include spaced apart ears 42 which are pivotally connected to the links 32 as for example by means of pivot pins 43. There is further provided a locking mechanism which is indicated generally by the numeral 45, and the locking mechanism 45 includes opposed plungers or keepers 46 which are mounted for movement into and out of engagement with recesses or openings 44 in the upper portions of the end wall 11. As shown in the drawings, coil springs 47 are circumposed on the plunger 46, and the inner ends of the plunger or keepers 46 are connected to arms 48. The inner portions of the arms 48 are fastened together as for example by means of a connector or cross piece 49, and a handle 50 is suitably connected to the connector 49 for actuating the locking mechanism 45 as later described in this application.

From the foregoing, it is apparent that there has been provided an accessory or device which is especially suitable for use with trailers or mobile homes and according to the present invention a plurality of the devices of the present invention are adapted to be arranged in a suitable location such as in a trailer park and in installing or making the device, the pit 10 which consists of a vertical wall 11 and 12 and a bottom wall 13 are arranged in the ground 21, as for example as shown in FIGURE 1, and the interior of the member 12 is hollow and the upper portion of the member 10 may be flush with the upper surface of the ground 21. Then, with the devices arranged in a trailer park or other locality, it will be seen that mobile homes or trailer houses are adapted to be parked or arranged so that their wheels such as the wheels 37 engage the platform 35, and when the trailer is initially parked, the platform 35 and its associated parts are in the raised or elevated position as shown in FIGURE 1.

After the trailer 38 has been parked, the hydraulic cylinders 19 are suitably actuated, as for example by means of the control valve 24 so as to permit the rods 25 to move inwardly into the cylinders 19 so that the parts will move from the position shown in FIGURE 1 to the position shown in FIGURE 4 and due to the provision of the crank and connecting linkage, it will be seen that as the piston rods 25 move inwardly into the cylinders 19, the platform 35 can move downwardly from the position shown in FIGURE 1 to the position shown in FIGURE 4 whereby the wheels 37 will drop downwardly into the pit 10 so that the main body portion 39 of the member 38 will be supported on the ground level, and wherein with the wheels 37 in the position of FIGURE 4 the trailer cannot be driven away as for example without payment of the rent for parking the trailer in the trailer park or the like.

When the trailer is to be driven or moved away, the reverse procedure is followed so that hydraulic fluid from a suitable source of supply can be pumped through the conduits 22 and 23 into the cylinders 19 so as to cause the piston rods 25 to move outwardly, and since the ends of the rods 25 are pivotally connected to the lugs 28 as at 29, and with the lugs 28 suitably affixed to the shaft portion 27 of the crank 26, it will be seen that outward movement of the piston rods 25 will cause counter clockwise rotation of the crank 26, as for example viewing the device in FIGURE 2. As the pair of cylinders 19 are simultaneously actuated, it will seem that both cranks 26 will be simultaneously actuated, and this counter clockwise movement of the cranks 26 will cause the fingers 31 to be moved in a corresponding direction. Due to the fact that the fingers 31 are pivotally connected as at 34 to the links 32, and with the links 32 connected to the brackets 41 on the lower surface of the beams 40, it will be seen that this actuation of the fingers 19 will cause the beams 40 to move upwardly so as to raise the platform 35 from the position shown in FIGURE 4 to a raised position such as that shown in FIGURE 1. Thus, with the platform 35 in the raised position, the platform is lower with the ground 21 so that the wheels 35 can readily roll onto or off of the platform as the user or operator desires.

In addition, as the platform 35 moves upwardly, the pair of plungers 46 will automatically move into engagement with the openings 44 in the top of the end wall 11 due to the provision of the springs 47, and this will have the effect of helping to stabilize or provide an additional support for the platform 35. When the platform 35 is to be released, the user can readily insert his or her hand through the suitable clearance space and engage the handle 50 so as to rotate the handle 50 and turn the connector 49 which will serve to pull on the pair of arms 48 so as to urge the plungers or keepers 46 inwardly against the pressure of the springs 47 so that the end of the plungers 46 will clear the openings 44 whereby upon proper actuation of the control valve 24, the hydraulic system will function to permit the platform 35 and its associated parts to move to a lower position.

The parts can be made of any suitable material and in different shapes or sizes.

Thus, according to the present invention it will be seen that there has been provided a means for making a trailer or mobile home more liveable and it is to be noted that there is provided a hydraulically actuated or operated platform 35 which serves to lower the wheels of a trailer or mobile home down into a pit so as to allow the body such as the body 39 of the trailer to rest on a base in order to shut out cold weather and prevent water lines from freezing.

Some of the advantages of the present invention are as follows. The present invention will eliminate corner jacks, and the trailer will rest down on a base so that it will automatically level itself. In addition, all underneath draft will be eliminated, and there will be a saving in fuel and wherein snow fences can be used there will be a saving in crawl space. In addition freezing of water pipes is prevented and since the body of the trailer or mobile home is lower to the ground, there will be no steps to climb, and the weight will be taken off of the tires and springs. In addition the tires will be protected from adverse weather conditions, and the trailer will be safer in wind storms. The platform can be raised or lowered quickly and the entire apparatus is inexpensive and easy to make and operate and install. Also, the present invention provides a safeguard for trailer park operators since it insures that a trailer cannot accidently pull away as for example in the middle of the night without paying the rent, and in order to guard against such an eventually suitable safety locking device can be used or provided for the hydraulic control system.

The platform 35 is supported by the I-beams 40, and the cranks 26 are adapted to be used for raising or lifting the platform. The platform 35 can be made of a plurality of planks, and the pit can be made of a suitable material such as concrete. Bearings 30 are provided for the rotating parts such as the cranks 26. A portable pump can be used in conjunction with the control valve 24.

Minor changes in shape, size and rearrangement of details coming within the field of invention claimed may be resorted to in actual practice, if desired.

What is claimed is:

1. In a trailer pit hoist, vertically disposed end walls, vertically disposed side walls, and a horizontally disposed bottom wall, a base in the lower portions of the trailer pit hoist, a pair of horizontally disposed spaced apart angle irons supported on said base and secured thereto, a pair of spaced apart hydraulic cylinders each having their ends pivotally connected between said angle irons, conduits connected to said cylinders and having a valve therein, piston rods adjustably connected to said cylinders, a crank connected to each piston rod, said crank including a shaft portion, transversely disposed fingers on the ends of said shaft portion, links having bifurcated ends pivotally connected to said fingers, brackets having spaced apart ears connected to said links, a pair of beams affixed to said brackets, a vertically movable platform supported on said beams and said platform adapted to receive wheels of a trailer thereon, and a locking mechanism for helping to maintain the platform in raised position.

2. In a trailer pit hoist, vertically disposed end walls, vertically dsiposed side walls, and a horizontally disposed bottom wall, a base in the lower portions of the trailer pit hoist, a pair of horizontally disposed spaced apart angle irons supported on said base and secured thereto, a pair of spaced apart hydraulic cylinders each having their ends pivotally connected between said angle irons, conduits connected to said cylinders and having a valve therein, piston rods adjustably connected to said cylinders, a crank connected to each piston rod, said crank including a shaft portion, transversely disposed fingers on the ends of said shaft portion, links having bifurcated ends pivotally connected to said fingers, brackets having spaced apart ears connected to said links, a pair of beams affixed to said brackets, a vertically movable platform supported on said beams and said platform adapted to receive wheels of a trailer thereon, and a locking mechanism for helping to maintain the platform in raised position, said locking mechanism including a pair of spring pressed keepers, arms connected to said keepers, a connector fastened to said arms, and a handle operatively secured to said connector.

3. In a trailer pit hoist, a base, a pair of horizontally disposed spaced apart angle irons supported on said base and secured thereto, a pair of spaced apart hydraulic cylinders each having their ends pivotally connected between said angle irons, conduit connected to said cylinders and having a valve therein, piston rods adjustably connected to said cylinders, a crank connected to each piston rod, links pivotally connected to said cranks, brackets connected to said links, a pair of beams affixed to said brackets, a vertically movable platform supported on said beams and said platform adapted to receive wheels of a trailer thereon, and a locking mechanism for helping to maintain the platform in raised position.

4. In a trailer pit hoist as in claim 3 wherein a pit having vertically disposed end walls is provided for said pit hoist and said end walls are provided with recesses therein and said locking mechanism includes a pair of spring pressed keepers that are receivable in the recesses in said end walls, arms connected to said keepers, a connector fastened to said arms, and a handle operatively secured to said connector.

References Cited in the file of this patent

UNITED STATES PATENTS

| | | |
|---|---|---|
| 489,755 | Prevear | Jan. 10, 1893 |
| 498,155 | Common | May 23, 1893 |
| 613,851 | Bryan | Nov. 8, 1898 |
| 1,127,462 | Lightheart | Feb. 9, 1915 |
| 1,706,211 | Coffey | Mar. 19, 1929 |
| 2,201,147 | Bary et al. | May 21, 1940 |
| 2,471,901 | Ross | May 31, 1949 |
| 2,605,007 | Gaynor | July 29, 1952 |